United States Patent [19]

Niehaus

[11] 3,841,205

[45] Oct. 15, 1974

[54] ELECTROMECHANICAL DETECTOR SYSTEM AND METHOD FOR CONTROLLING FLOW OF NEWSPAPER BUNDLES

[75] Inventor: William R. Niehaus, Cincinnati, Ohio

[73] Assignee: The E. W. Scripps Company, Cincinnati, Ohio

[22] Filed: Apr. 11, 1973

[21] Appl. No.: 350,087

[52] U.S. Cl. ............... 93/93 M, 93/93 R, 198/38, 198/40
[51] Int. Cl. ..................... B31b 1/98, B65b 27/08
[58] Field of Search...... 209/73, 74; 93/93 M, 93 C, 93/93 D, 93 K; 198/38, 40; 214/11 R; 939/3 R, 93 DP

[56] References Cited
UNITED STATES PATENTS

| | | | |
|---|---|---|---|
| 1,992,686 | 2/1935 | Anderson | 198/38 |
| 2,886,164 | 5/1959 | Solecki | 198/40 X |
| 2,986,264 | 5/1961 | Holben | 198/38 |
| 3,292,505 | 12/1966 | Wiseman | 93/93 M |
| 3,442,186 | 5/1969 | Hinose et al. | 93/93 M |
| 3,636,828 | 1/1972 | Achelnohl | 93/93 C |

Primary Examiner—Allen N. Knowles

[57] ABSTRACT

A system and method is disclosed for controlling the delivery of a predetermined number of bundles of newspaper in a newspaper room to a predesignated one of a plurality of chutes leading from a bundle conveyor to a delivery truck locations. The upper surface of the first and last bundle of the predetermined number are wetted with a conductive liquid, the wetted bundles are sensed and an electrical signal is produced to control deflection of the bundles to the desired chute, and the total number of bundles is counted. A programmed counting mechanism controls the wetting of the first and last bundles. Reciprocable detecting probes are provided to sense the wetted bundles as well as the non-wetted bundles, and the probes each include telescopically associated housing members and switch contact elements which close when the probe engages the upper surface of a bundle. Control circuitry is provided including means responsive to closing of the contact elements to produce a count signal for the counter mechanism and to produce an output signal when a wetted bundle is sensed to control the mechanism by which the bundles are deflected to the desired chute.

17 Claims, 3 Drawing Figures

ELECTROMECHANICAL DETECTOR SYSTEM AND METHOD FOR CONTROLLING FLOW OF NEWSPAPER BUNDLES

The present invention relates to the art of material handling and, more particularly, to the marking and controlling of the delivery of a predetermined number of articles from a conveyor at a selected one of a number of discharge points along the conveyor path.

The present invention finds particular utility in connection with the control of the delivery of bundles of newspapers in a newspaper room from a newspaper stacking device to any one of a number of discharge chutes leading to delivery trucks for the newspaper bundles. Accordingly, the invention will be described in detail in connection with such use. It will be appreciated, however, that the principals of the present invention are applicable to the control of the delivery of articles other than newspaper bundles.

AS is well known in the newspaper industry, paper is printed, collated and folded to define a newspaper, and such newspapers are delivered to the mailroom of the newspaper plant for stacking, tying and delivery to trucks which carry the bundles to distribution points and the like. The stacking mechanism is controlled to provide a predetermined number of newspapers in a given stack, and each delivery truck is scheduled to receive a predetermined number of bundles each having a predetermined number of newspapers therein. The bundles are generally moved along a conveyor path from the stacking mechanism to a tying station at which the stacked newspapers are bound such as by wire, and thence along the conveyor path toward a plurality of discharge chutes leading to discharge stations at which delivery trucks are positioned. The delivery of a predetermined number of bundles to a given truck requires the operation of mechanisms at the chute locations which operate to deflect bundles from the conveyor into the chute. Moreover, appropriate mechanism must be provided for counting the number of bundles to be deflected to a given chute in order to be sure that the delivery truck receives the proper number of bundles.

Presently, such counting and distribution of newspaper bundles is performed either manually or by computer software. For example, counting has been achieved by electric-eye arrangements, and distribution of bundles by deflection to a given chute has been performed manually by an operator who opens or closes the deflector mechanism for the appropriate chute by remote control. Other systems for counting and distributing bundles have included marking the last bundle for each truck load as it leaves the stacker and detecting the last bundle downstream from the stacker mechanism so as to provide a singal for the operator.

In the systems heretofore known, the counting and distribution methods have created certain problems which lead, for example, to the delivery of an improper number of bundles to a given truck. It will be appreciated that the number of newspapers printed is based on predetermined distribution numbers, and that the delivery of a given number of bundles to a given location is likewise predicated upon known factors concerning distribution at or from that location. Accordingly, it is extremely important that the proper number of bundles of newspapers be delivered to a given truck for delivery to a given destination. The systems employed heretofore, as mentioned above, employ an operator to remotely control the deflection of bundles from the conveyor to a given chute, whereby the delivery of bundles is subject to human error. The sitting and watching of conveyed bundles is at best a cumbersome job, and an instant of inattention on the part of the operator can cause an error not only in the delivery of bundles to a given truck but in subsequent deliveries to other waiting trucks. In this respect, one error can upset the entire schedule of counting and bundle delivery. Moreover, if the operator inadvertently actuates the wrong chute deflector, then the bundles scheduled for one truck are delivered to another truck. Such disruptions in the planned schedule of events in a newspaper mailroom cause confusion and time consuming delays which can result in considerable economic loss.

Electric-eye counting and control mechanisms have also been employed heretofore, and these systems are subject to interruption other than by a bundle moving past the electric-eye components. For example, employees in the mailroom of the newspaper plant may accidently or purposely place an article between the transmitting and receiving components of the electric-eye system and thus place an error in count of bundles or the operation of mechanisms controlled by the electric-eye system. This, of course, disrupts the intended delivery operation and results in the delivery of an improper number of bundles to a given truck or the delivery of a given number of bundles to the wrong truck.

Accordingly, it is desired to provide a system for detecting newspaper bundles so as to automate the counting and distribution thereof in a manner which avoids the necessity of an operator to control chute mechanisms and which avoids disruption of the counting and delivery operation by intentional or unintentional acts of employees in the mailroom. A system in which the foregoing desired end results are achieved is provided in accordance with the present invention.

The present invention advantageously provides for the first and last bundles in a given number of bundles to be marked and for the marked bundles to be detected so as to control the actuation of mechanism by which the given number of bundles is deflected from the conveyor path to a chute leading to a given delivery truck or the like. More particularly, the system of the present invention provides for counting each bundle in the given number through a detecting mechanism which also operates to detect the marked bundles. The detecting mechanism is not subject to interference by an employee, whereby the counting of the proper number of bundles is assured.

In accordance with one aspect of the present invention, the upper surface of the first bundle in a given number of bundles to be delivered to a given truck is sprayed with a conductive liquid such as water in response to programmed control signals. The detector mechanism includes a pair of probes which are connected in electrical series with one another upon engaging the upper surface of the bundles. When the bundle engaged is the first bundle which is wet, the conductive liquid decreases the resistance to the flow of current across the probes so that a control signal is produced by which appropriate actuation of the mechanism for deflecting bundles from the conveyor is achieved. When the bundle engaged is dry, a null signal is produced, and such null signals together with the signal produced by engagement of the probes with the first st bundle provide count signals which are fed to a programmed counting device. The counting device is operable in response to the count received to determine the last bundle of the predetermined number and cause wetting thereof. When the last bundle is detected by the probes, the resultant signal operates to actuate the control mechanism for delivery to the particular chute so that the chute closes after delivery of the last bundle thereto. Any number of chutes may be provided along the conveyor line, and the system is operable to deliver a given number of bundles selectively to any one of the chutes.

In accordance with another aspect of the present invention, the detecting probes are disposed above the conveyor path and are vertically extendable and retractable into and out of engagement with a bundle therebeneath. More particularly, the probes are actuated to an extended disposition upon a control signal from the stacker mechanism, and when the probes engage a bundle therebeneath the count and/or control signal described above is produced. The probes then retract into the support housing therefore. Accordingly, it will be appreciated that the probes are not subject to being tampered with in a manner which will disrupt the counting sequence. Further, the probes each include a normally open switch contact assembly which closes when and only when a bundle is engaged. Both contact assemblies must close for a count and/or control signal to be produced, and each probe is extended independently of the other until the bundle is engaged, whereby the probes are operable to detect bundles of different height and to provide a signal even if the upper surface of a given bundle is inclined relative to horizontal. Thus, the probes provide efficient means for detecting the wetted first and last bundles and for counting the bundles to assure delivery of the proper number of bundles to a given chute without the assistance of chute operating personnel or the likelihood of a miscount due to intentional or unintentional action on the part of an employee.

An outstanding object of the present invention is the provision of a method of automating the counting distribution of articles being conveyed along a path so that a predetermined number of such articles are deflected from the path at a selected one of a number of discharge points therealong.

Another object is the provision of a method of the foregoing character by which the counting of articles and the deflection of a predetermined number of articles from the conveyor path at the selected discharge point is achieved automatically in response to the marking and sensing of the first and last articles in a given number.

A further object is the provision of a method of controlling the delivery of a predetermined number of bundles of newspapers from a conveyor to a selected discharge path leading from the conveyor by wetting a surface of the first and last of the predetermined number of bundles, detecting the wetting surfaces of the first and last bundles, and actuating a deflector at the selected discharge location first in response to detecting the first bundle and to cause displacement of bundles from the conveyor path and secondly in response to sensing the last bundle and to terminate deflection of bundles from the conveyor path at the selected location.

Still another object of the present invention is the provision of an article handling system wherein the first and last of a predetermined number of articles are marked and detected as they move along a conveyor path and, in response to such detection, are deflected from the conveyor path at a selected one of a plurality of discharge points therealong.

A further object is the provision of a system of marking, counting and distributing bundles of newspapers in a newspaper plant mailroom which is more efficient in operation than previous systems and which minimizes the possibilities of errors in count and distribution of bundles.

Yet a further object is the provision of a system of the latter character wherein the first and last bundles of a given number are marked automatically, all of the articles are detected and counted automatically, and the first and last bundles are detected to produce a control signal by which deflection of the bundles from a conveyor path is achieved automatically.

Another object is the provision of a newspaper handling system of the foregoing character which is automatic and independent of operator assistance to control the deflecting mechanism and/or discharge location, and which is operable to accurately control the counting and discharging of a predetermined number of bundles from the conveyor path.

Still another object of the present invention is the provision of an article detecting probe which enables articles to be detected and counted as they move along a conveyor path and which probe is operated automatically and is free from interference in operation by conditions external to the article handling apparatus.

Still another object is the provision of a probe of the foregoing character which is reciprocable relative to an article to be sensed to provide for the sensing of articles of varying height relative to the conveyor on which they are disposed.

Still a further object is the provision of a probe of the foregoing character which is extended in response to a control signal to engage an article and which includes contact means closed in response to engagement with the article to produce a signal operable to cause retraction of the probe to its initial position.

The foregoing objects, and others, will in part be obvious and in part more fully pointed out hereinafter in conjunction with the description of the accompanying drawing illustrating preferred embodiments of the present invention and in which:

Figure 1:
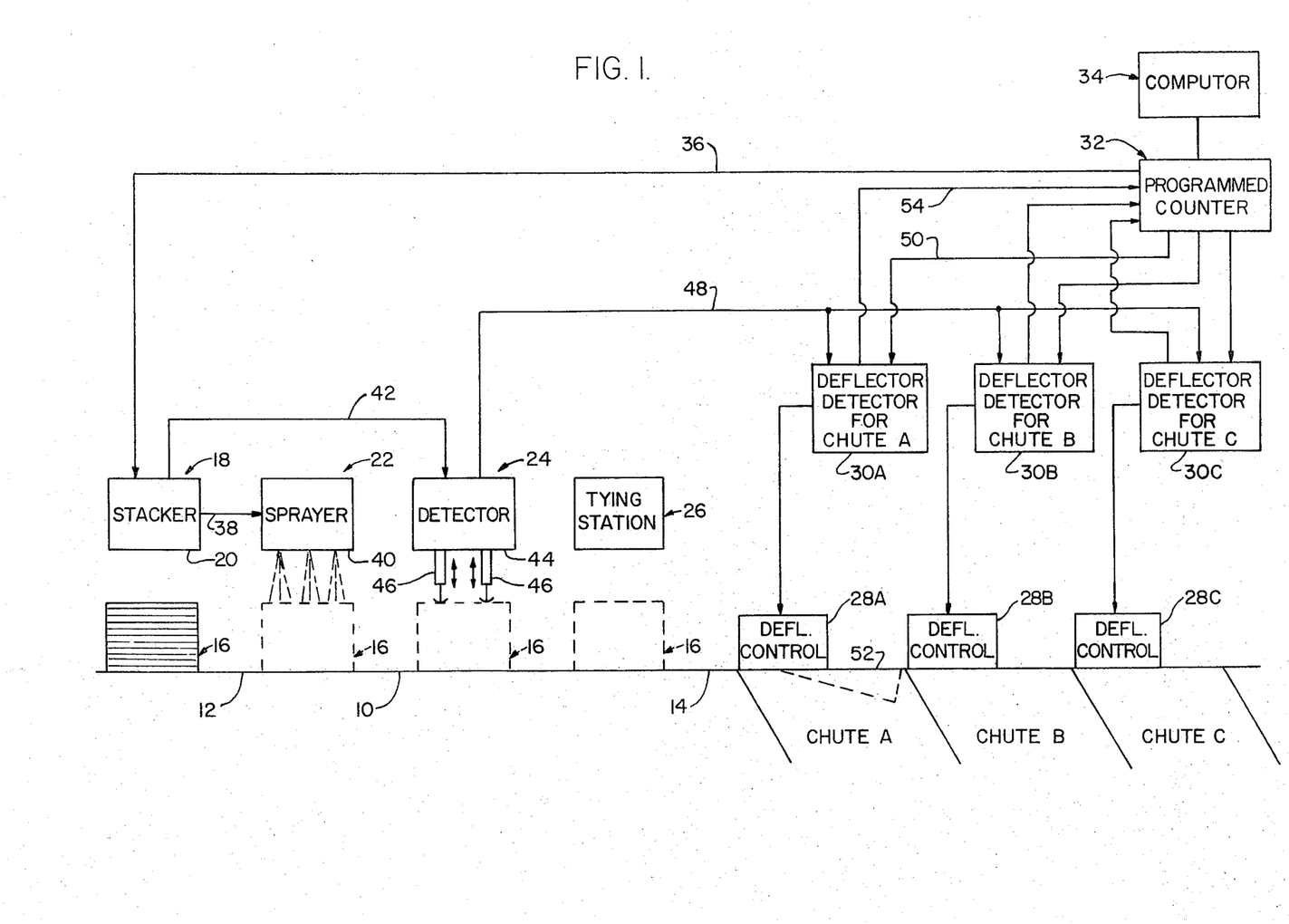
FIG. 1 is a schematic illustration of a newspaper bundle handling system in accordance with the present invention.

Referring now in greater detail to the drawings wherein the showings are for the purpose of illustrating preferred embodiments of the present invention only and not for the purpose of limiting the same, the components of the system of the present invention are illustrated schematically in FIG. 1. More particularly, line 10 represents the upper surface of a conveyor along which articles are moved progressively from an input end 12 towards an output end 14. In the embodiment illustrated, the articles being conveyed are bundles of newspapers designated generally by the numeral 16. Each bundle 16 is formed at a stacking station 18 by a stacker mechanism 20 and in a manner well known in the newspaper industry. Each bundle is then moved along the path of conveyor 10, successively past a spraying station 22, a detecting station 24 and a tying station 26. Each bundle then proceeds along the conveyor path towards a plurality of discharge chutes, three of which are illustrated in the present embodiment and designated chute A, chute B and chute C. A predetermined number of bundles 16 is deflected from conveyor 10 into a selected one of the three chutes as described more fully hereinafter. The chutes lead to delivery truck locations, whereby the bundles deflected into a given chute are delivered to a given truck.

The system further includes deflector control mechanisms 28A, 28B and 28C for chutes A, B and C, respectively, and deflector detector control components 30A, 30B and 30C for the corresponding chute. A counter mechanism 32 is adapted to be programmed as described more fully hereinafter to control the system operation. Counter mechanism 32 can be programmed in any desired manner such as by feedout of information from a computer 34 associated therewith. The details concerning the computer and programmable counter mechanisms are not pertinent to the present invention and, accordingly, will not be described in detail. The computer is adapted to feed information to counter 32 with respect to the total number of bundles to be displaced from the conveyor path to one of the chutes and the particular chute into which the bundles are to be deflected. This information, of course, corresponds with the number of bundles to be delivered to a given delivery truck and the location of the given truck with respect to the three available discharge chutes.. Computers for this purpose are well known, and a suitable computer for the system being described will be readily suggested to those skilled in the art. Counter mechanism 32, for the purpose set forth more fully hereinafter, is adapted to produce an output signal to control the marking of the first and last bundles in a given number of bundles to be deflected from the conveyor path, and to provide an output signal to the appropriate one of the deflector detectors 30A, 30B and 30C so that the corresponding deflector control mechanism is actuated, at the proper time, to insure displacement of the number of bundles into the corresponding chute.

Operation of the system is initiated upon a command from the computer to the counter indicating, for example, that 25 bundles of newspaper are to be delivered along the conveyor path and deflected into chute A. Counter 32 then provides an output signal through line 36 to stacker mechanism 20 and an output signal through line 50 to deflector detector 30A. The signal through line 36 to stacker mechanism 20 initiates movement of a stack 16 at the stacking station along conveyor 10 to spraying station 22. Stacker mechanism 20 includes appropriate control circuitry to deliver the starting signal from the counter through line 38 to the spray mechanism 40 at spraying station 22. Spray mechanism 40 is actuated by the signal to spray a conductive liquid such as water onto the upper surface of the first bundle 16 of the 25 to be delivered to chute A. Stacker mechanism 20 in the meantime is preparing a second stack of newspapers.

The first bundle and the succeeding bundles are moved along the conveyor at a predetermined feed rate from the stacker to the sprayer and thence successively to the detecting station, to the tying station where appropriate mechanism operates to bind the stack of newspapers such as with wire, and thence toward the discharge chute locations.

The stacker mechanism includes appropriate means, not illustrated, to send a control signal through line 42 to detector mechanism 44 at detecting station 24 each time a bundle leaves the stacker mechanism. The latter signal from the stacker mechanism for a given bundle controls actuation of the detector mechanism for the latter to detect the presence of the given bundle when the latter reaches station 24.

The detector mechanism includes a pair of probes 46 the structure and operation of which is described in greater detail hereinafter. Each probe 46 is extendable and retractable and is normally retracted relative to the detector mechanism 44. In response to the control signal through line 42 the probes are extended when the bundle reaches station 24 to engage the upper surface of the bundle. In response to engaging a bundle 16, the detector mechanism transmits a control signal through line 48 to the appropriate deflector detector, which in the embodiment being described is deflector detector 30A for chute A.

Counter 32 is programmed by the information from the computer to actuate the proper deflector detector and accordingly, as mentioned above, feeds a signal through line 50 to deflector detector 30A so that the signal through line 48 from the detector mechanism 44 is introduced into deflector detector 30A. When the bundle 16 at the detecting station is the first bundle having the wetted upper surface, the signal delivered through line 48 to deflector detector 30A is, as pointed out more fully hereinafter, such that the latter operates to actuate deflector control mechanism 28A so that chute A is opened. In the schematic illustration of FIG. 1, chute A is illustrated as including a door 52 movable between the solid line position thereof and the dotted line position thereof representing the open condition of the chute. This illustration is for purpose of convenience of description only and it will be appreciated that the deflector mechanism may operate to deflect bundles to either side of the conveyor path as opposed to the downward displacement illustrated in FIG. 1.

When the bundle 16 at the detecting station is the second through twenty-fourth bundle, which latter bundles are not wetted, engagement of probes 46 with a bundle produces a null signal, as explained more fully hereinafter, which is delivered through line 48 to deflector detector 30A. Accordingly, it will be appreciated that a signal is delivered through line 48 to deflector detector 30A each time a bundle is disposed at the detecting station. Deflector detector 30A in response to these signals sends a count signal through line 54 to counter 32 which operates in a well known manner to progressively determine the number of bundles detected. Upon receipt of a signal indicating that 24 bundles have been counted, counter 32 again transmits a signal through line 36 through stacker mechanism 20 and line 38 to sprayer mechanism 40 so that the 25th and last bundle in the group is sprayed on the upper surface thereof with the condutive liquid.

When the 25th bundle reaches detecting station 24, probes 46 engage the upper surface thereof and a signal is sent through line 48 to deflector detector 30A and the latter responds to this signal to actuate deflector control mechanism 28A to close chute A when the 25th bundle has been deflected thereinto. The count signal for the 25th bundle is delivered through line 54 to counter 32 indicating completion of the delivery of the 25 bundles to chute A. Counter 32 then receives or has previously received information from computer 34 for the next scheduled delivery of a predetermined number of bundles to, for example, chute B. The programmed counter then provides an output signal to deflector detector 30B to ready the latter to energize deflector mechanism 28B, and provides an output signal through line 36 to stacker mechanism 20 to initiate the next sequence of bundle delivery. The system then functions as outlined above to deliver the second predetermined number of bundles to chute B. Chute A being closed enables the bundles to move therepast to chute B.

Figure 2:
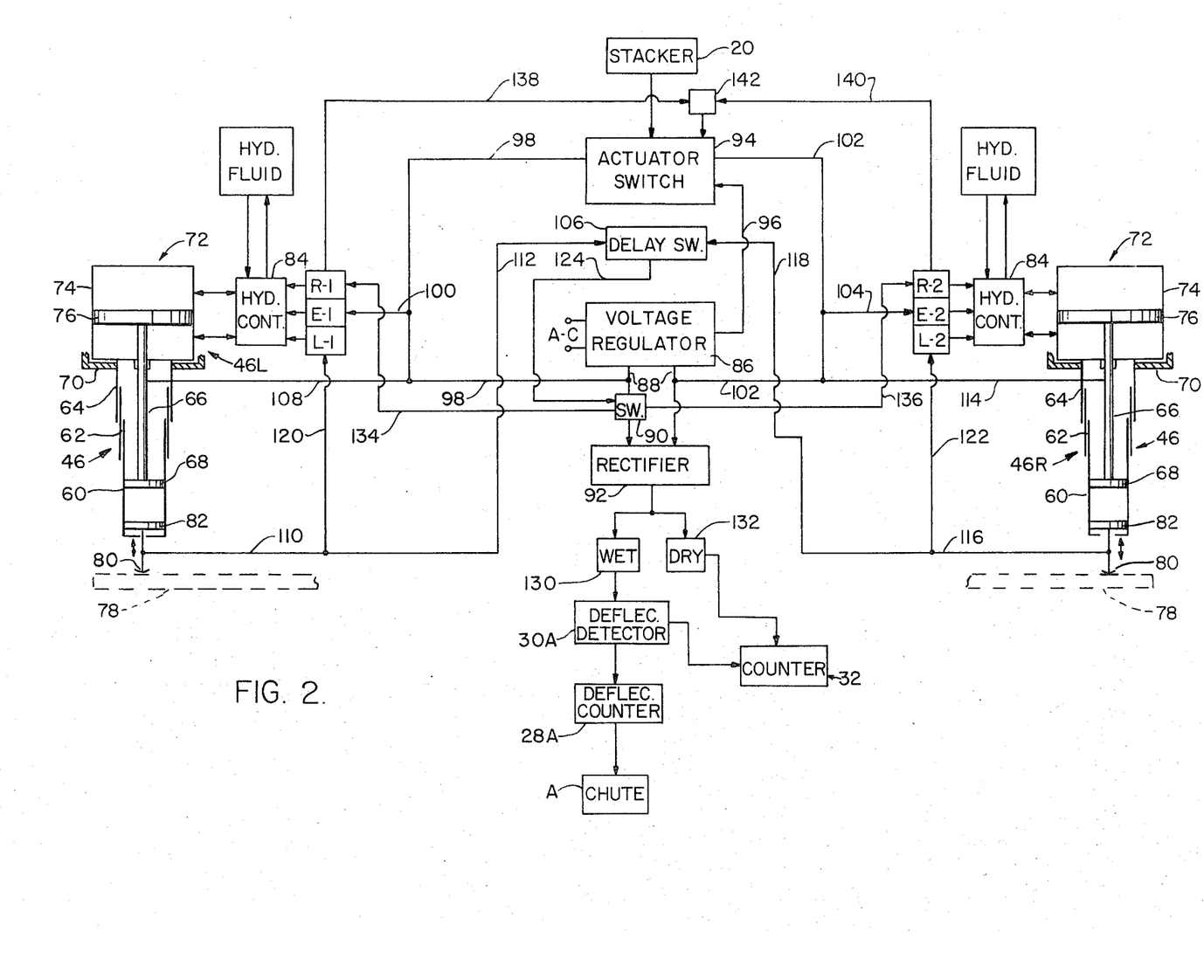
FIG. 2 is a schematic illustration of a portion of the control circuit by which the operation of the system illustrated in FIG. 1 is controlled; and, FIG. 3 is an elevation view,, in section, of the article detecting probe of the present invention.

The operation of the probes at the detector station and the control functions described above with regard to the schematic illustration in FIG. 1 will be more clearly understood upon reading the following description of the circuitry illustrated in FIG. 2 of the drawing. To facilitate the description, probes 46 are identified in FIG. 2 as 46L and 46R indicating their respective locations on the left and right hand sides of the drawing. With regard to FIG. 2, probes 46L and 46R, the structures of which are described in greater detail hereinafter, each comprise telescopically associated tubular housing components 60, 62 and 64, a conductor rod 66 extending axially therethrough and having a lower end rigidly interconnected with housing tube 60 such as by a contact disc 68. The upper end of housing tube 64 is rigidly attached to a support housing 70 in which actuating means 72 for the probe is disposed. Any suitable actuating mechanism may be employed including, for example, electrical, electromechanical, pneumatic, or hydraulic mechanisms. For purposes of the present description, actuating mechanism 72 is illustrated as a hydraulic unit including a cylinder 74 and a piston 76 connected to the upper end of conductor rod 66. It will be appreciated that reciprocating movement imparted to conductor rod 66 by piston 76 causes extension and retraction of the probe assembly relative to the upper surface of a bundle therebeneath, which upper surface is represented by the numeral 78 in FIG. 2. The lower end of the probe is provided with a contact 80 reciprocable relative to housing tube 60 and thus contact disc 68. The inner end of contact 80 carries a contact plate 82 for engagement with disc 68 thus to complete a circuit through contact 80 and conductor rod 66 when the probe engages upper surface 78 of a newspaper bundle.

Cylinder 74 of the hydraulic mechanism is adapted to receive and exhaust hydraulic fluid through appropriate passageways located above and below piston 76 in a well known manner. A hydraulic control unit 84 is provided to control the opening and closing of valves or the like by which such fluid flow is controlled. More particularly, hydraulic control unit 84 is operable to control fluid flow into and out of cylinder 74 in a manner to extend the corresponding probe, lock the probe in an extended disposition, and retract the probe. These functions of hydraulic control unit 84 are carried out in response to electric control signals from a probe actuator mechanism comprised of suitable electronic switch devices including a retraction switch R–1, an extension switch E–1 and a locking switch L–1 for probe 46L, and similar switches R–2, E–2 and L–2 for probe 46R. Each of the probes is moved independently in the extending and retracting directions through the corresponding actuator mechanism and the latter's control of the corresponding hydraulic control mechanism 84.

The circuitry illustrated in FIG. 2 further includes a voltage regulator 86 connected to a suitable source of alternating current and having a reduced voltage output through lines 88 and switch 90 to a rectifier 92. The circuitry further includes an actuator switch 94 connected to the alternating current voltage source through line 96 from voltage regulator 86. The specific structures of voltage regulator 86, rectifier 92 and actuator switch 94 are not pertinent to the present invention and accordingly will not be described in detail. Actuator switch 94 is adapted to be turned on and off by electrically controlled signals so as to respectively close and open an electrical path therethrough, and many suitable switches for this purpose will be apparent to those skilled in the art.

Actuator switch 94 is associated with the detecting mechanism previously described and receives the signal from the stacker mechanism as described above in conjunction with FIG. 1. The signal from the stacker mechanism turns actuator switch 94 on to close the path therethrough for flow of current from the voltage source. When turned on, actuator switch 94 delivers a control signal through lines 98 and 100 to extension switch E–1 and through lines 102 and 104 to extension switch E–2. The corresponding hydraulic control mechanism 84 is thus actuated to cause extension of the corresponding probe downwardly to engage the upper surface 78 of a bundle therebeneath. Upon engagement of the probes with upper surface 78, contact 80 is pushed inwardly of housing tube 60 for contact plate 82 to engage contact disc 68 on the lower end of conductor rod 66. A circuit is thus completed between conductor rod 66 and contact 80 whereby an electrical signal is delivered from each of the probes to a common delay switch 106. More particularly, the signal from the actuator switch 94 through line 98 is transmitted therefrom to line 108, thence through conductor rod 66 and contact 80 of probe 46L to line 110, and from line 110 to line 112 leading to delay switch 106. Similarly, the signal from actuator switch 94 to line 102 is transmitted to line 114, thence through the conductor rod 66 and contact 80 of probe 46R to line 116 and then line 118 leading to delay switch 106. Simultaneously with the delivery of the latter signals, signals are delivered through line 120 to locking switch L–1 and line 122 to locking switch L–2. Switches L–1 and L–2 then actuate the corresponding hydraulic control mechanism 84 to lock the probes in their extended positions.

Delay switch 106 is adapted to conduct only when it receives a signal from both probe units indicating that each probe is in the extended position and in contact with a bundle. When delay switch 106 receives both signals it conducts to transmit a signal through line 124 to switch 90 disposed in one of the voltage regulator output lines 88. The signal from delay switch 106 actuates switch 90 to close the corresponding line 88 whereby the voltage regulator output is connected to rectifier 92.

Conductor rods 66 of the two probes are connected each to one of the voltage regulator output lines 88. More particularly, conductor rod 66 of probe 46L is connected to one of the lines 88 through lines 108 and 98, and probe 46R is connected to the other of the voltage regulator output lines through lines 114 and 102. When both probes engage upper surface 78 of a bundle such as to close the corresponding contact plates 68 and 82 of the probes, the probes are connected in series by means of the paper material therebetween. If the particular bundle under the probes is dry the resistance afforded by the material is high, whereas if the upper surface of the bundle is wet the resistance is decreased by the conductivity of the wet paper. In either instance, an electrical signal is delivered to rectifier 92 which converts the signal to a DC voltage.

The rectifier signal is delivered to a pair of voltage responsive devices 130 and 132. Voltage responsive device 130 is adapted to conduct if the voltage signal is above a predetermined level indicating that the upper surface 78 of the bundle is wet. Voltage responsive device 132 is adapted to conduct upon the receipt of a null signal indicating that the upper surface 78 of the bundle is dry. When the bundle surface is wet, the device 130 conducts to send a control signal to the particular deflector detector, in this instance detector 30A, which has been prepared by the counter 32 to receive the signal as described above in conjunction with FIG. 1. The deflector detector then transmits a control signal to the corresponding deflector control mechanism 28A to cause actuation of the corresponding chute deflector. The deflector detector 30A is a suitable electronic switching device which responds to a first signal received from voltage responsive device 130 to actuate the deflector control mechanism 28A to cause articles to be deflected into chute A, and which responds to receipt of a second signal from voltage responsive device 130 to reverse the actuation of the deflector control mechanism and thus close or prevent further deflection of bundles to chute A. The deflector control mechanism can be an electrical, electromechanical, phenumatic or hydraulic operated device which operates alternately to shift the deflector between operable and inoperable positions. If the upper surface 78 of the bundle is dry, voltage responsive device 132 conducts to transmit a count signal to counter mechanism 32. Further, deflector detector 30A transmits a count signal to counter 32 upon receipt of the signals from voltage responsive device 130.

As mentioned hereinabove, the control signal from delay switch 106 through line 124 actuates switch 90 to provide for the probe signal to be delivered to rectifier 92. The actuation of switch 90 by the signal from delay switch 106 also causes the control signals to be delivered through lines 134 and 136, respectively, to retracting switches R-1 and R-2. In response to these signals the switches R-1 and R-2 actuate the corresponding hydraulic control mechanism 84 to cause retraction of the corresponding probe. When the probe is fully retracted, suitable means associated therewith and not illustrated, such as a limit switch, causes the signals from switch 90 to be delivered from retraction switch R-1 through line 138 and from retraction switch R-2 through line 140 to a common delay switch 142 which, upon receiving signals indicating both probes to be retracted is operable to deliver a signal to actuator switch 94 which turns the latter switch off and thus prepares the control circuitry for the next detecting function upon receipt of a signal from stacker mechanism 20.

Figure 3:
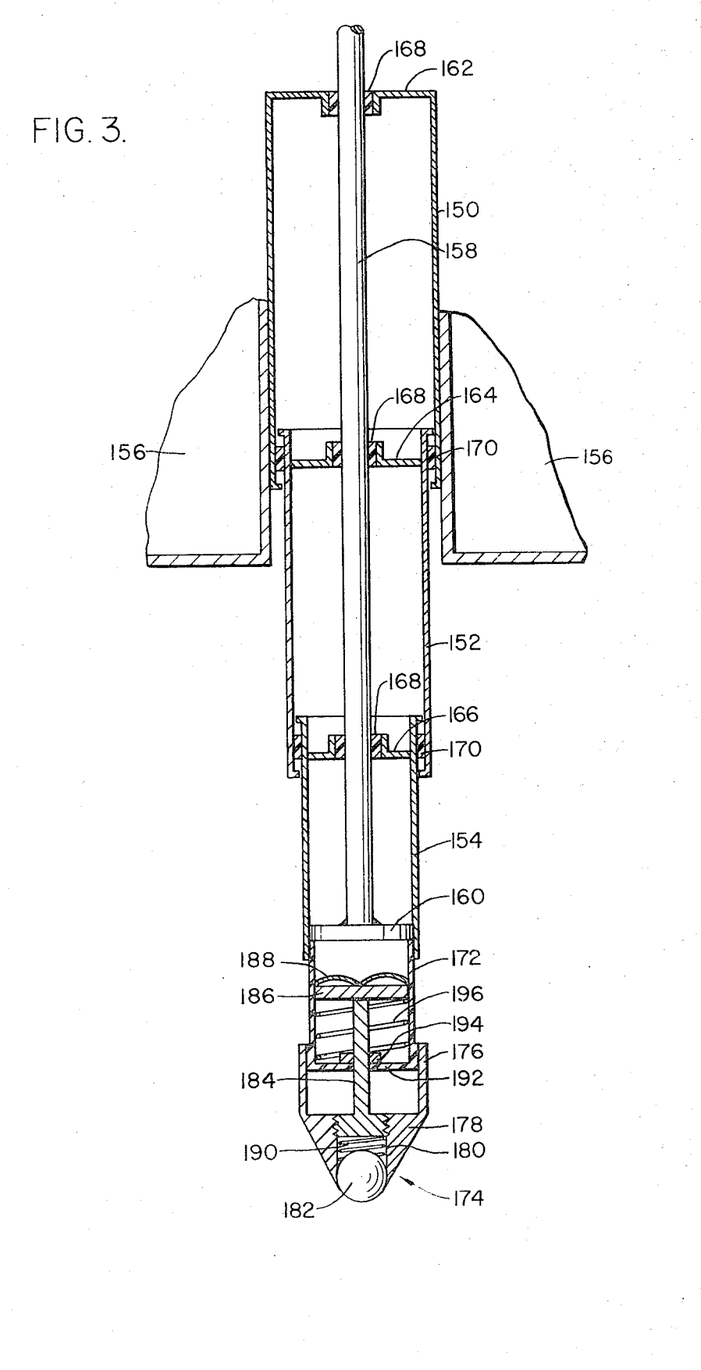

Referring now to FIG. 3, there is illustrated a preferred embodiment of the structure of the probes described hereinabove. More particularly, the probe is comprised of a tubular housing defined by three telescopically associated tubular housing components 150, 152 and 154. These components may be made of any suitable material such as metal and may be of any desired cross section and preferably are circular in cross section. Housing component 150 is fixedly secured in any suitable manner to a support component 156 disposed at the detecting station in overlying relationship with respect to the conveyor. Housing component 152 is longitudinally slideable relative to housing component 150, and housing component 154 is slideable relative to housing component 152. Metallic conductor rod 158 extends axially through the housing components, and a metallic disc 160 is connected to the lower end of rod 158 such as by welding. The peripheral edge of disc 160 is suitably interconnected with the inner surface of housing component 154 such as by welding or brazing. It will be appreciated, therefore, that reciprocating movement imparted to conductor rod 158 causes housing components 152 and 154 to reciprocate relative to one another and to housing component 150, thus to achieve extension and retraction of the probe. The upper end of conductor rod 158 can be connected to any suitable mechansim for imparting reciprocation thereto, such as the hydraulic unit illustrated in FIG. 2.

The upper ends of housing components 150, 152 and 154 are provided with apertured metal plates 162, 164 and 166, respectively, through which conductor rod 158 extends and which plates are suitably interconnected with the corresponding housing component. Sleeve 168 of electrical insulating material are disposed in the apertures of plates 162, 164 and 166 in surrounding relationship with respect to conductor rod 158, and the plates and sleeves serve to guide reciprocating movement of the conductor rod and to electrically insulate the conductor rod from the housing components if the latter are made of metal. It will be appreciated that the housing components and aperture plates could be made of nonconductive material, whereby the provision of sleeves of insulating material would not be necessary. Bearing sleeves 170 are disposed between housing components 150 and 152 and between housing components 152 and 154 to enhance the sliding engagement therebetween. Bearing sleeves 170 preferably are of electrical insulating material, especially if the housing components are produced from conductive material. The lower end of housing component 154 is provided with a sleeve 172 of electrical insulating material which extends below the lower edge of housing component 154 to support a reciprocable probe contact assembly 174. Sleeve 172 and housing component 154 can be interconnected in any suitable manner such as by the use of mechanical fasteners, threaded interengagement, or suitable bonding.

Contact assembly 174 includes a sleeve 176 of conductive material having a conical end wall 178 defining a tip for the probe. Wall 178 is provided with an opening 180 extending axially therethrough and in which a spherical ball 182 is disposed. Ball 182 is of conductive material, and the lower end of wall 178 is turned in in a well known manner to support ball 182 for rotation in opening 180. The inner end of opening 180 is threaded to receive the cooperatively threaded end of a contact finger 184 which extends axially of sleeve 176 and into insulating sleeve 172 of the housing assembly. A contact carrying plate 186 is attached to the inner end of contact finger 184 and supports an annular metal contact spring 188 which has portions of arcuate contour in cross section. Contact finger 184, plate 186 and contact spring 188, of course, are produced of conductive material.

A contact spring 190 is disposed between the lower end of contact finger 184 and ball 182 to bias ball 182 axially outwardly with respect to end wall 178. Spring 190 is of conductive material and the biasing force thereof against ball 182 is adapted to be adjusted by the threaded engagement between contact finger 184 and opening 180.

Sleeve 176 engages the outer surface of insulator sleeve 172, thus to guide reciprocating movement of contact assembly 174 relative to the probe housing. To further facilitate guidance of contact assembly 174, an apertured end plate 192 of insulating material is disposed across the lower end of sleeve 172 and is suitably interconnected therewith. It will be appreciated, however, that end wall 192 can be integral with sleeve 172. Contact finger 184 extends through the aperture in end plate 192 and is provided with a stop collar 194 which limits outward movement of contact assembly 174 relative to the probe housing. A positioning spring 196 is disposed in sleeve 172 between plate 186 and end wall 192 and is suitably interconnected therewith to bias the contact assembly toward the extended position thereof relative to end wall 192. In this respect, the spring may be suitably attached at one end to end wall 192 and at the other end to contact support plate 186 so that the spring is expanded upon movement of contact assembly 174 toward end wall 192, whereby spring 196 imposes a pulling force on the contact assembly.

When conductor rod 158 is displaced to extend the probe toward an underlying bundle of newspaper as described hereinabove, ball 182 engages the uppper surface of the bundle and is stopped thereby. Ball 182 is rotatable in opening 180 and this permits the underlying bundle to move relative to the probe without the probe tearing the paper. When ball 182 engages the upper surface of the bundle and stops, further movement of conductor rod 158 to extend the probe causes insulating sleeve 172 of the housing assembly to descend relative to sleeve 176 of contact assembly 174. This eventually brings spring contact 188 into engagement with contact plate 160 on the lower end of conductor rod 157, thus to complete an electrical circuit through ball 182, spring 190, contact finger 184, contact support plate 186, contact spring 188, contact plate 160 and rod 158. When conductor rod 158 is displaced to retract the probe assembly, ball 182 remains in engagement with the underlying bundle as a result of the influence of spring 196 on the contact assembly, whereby elevation of the probe housing moves contact plate 160 out of engagement with contact spring 188, thus to break the foregoing electrical circuit.

The probe assembly described hereinabove advantageously provides for the probes at the detecting station to retract completely into the support structure therefor, thus to avoid exposure of the probes following a detecting operation. Moreover, the telescoping relationship of the probe housing provides for the probe element to be extended whatever distance is required to provide for the contact assembly at the lower end of the probe to contact a bundle and close the circuit through the conductor rod. This advantageously enables the probe to detect bundles of different thicknesses or heights relative to the conveyor surface, and provides together with the independent actuation of the two probes for the probes to sense a bundle wherein the upper surface of the bundle is slanted in a direction which requires the probes to extend to different lengths to engage the bundle.

It will be appreciated that while a probe of the foregoing structure is preferred for the advantages provided thereby, other probe arrangements can be used with the system described herein to achieve the sensing and control signal delivery functions.

It is to be distinctly understood that the foregoing descriptive matter is to be interpreted as merely illustrative of the present invention and not as a limitation. In this respect, many embodiments of electrical circuitry, circuit components, controlling and controlled elements of the system interrelated in a manner to achieve the marking, sensing, counting and displacement functions of the present system will be apparent to those skilled in the art upon reading the foregoing description of the arrangement and operation of the various components illustrated and described herein. Moreover, it will be appreciated that many arrangements of the marking, sensing and tying components relative to a conveyor line and discharge paths leading therefrom can be provided in place of the sequence of arrangements herein illustrated and described. In this respect it will be appreciated that the sequence of stations are merely intended to facilitate the description and not to restrict the location of such stations and the control mechanisms relative to the stacking mechanism and discharge chutes leading from the conveyor system. For example, the detecting probes can be positioned immediately adjacent each of a series of discharge chutes along the conveyor path to sense the presence of the first and last bundles of a group and actuate the corresponding mechanism by which the bundles are deflected to the chute. With such an arrangement each set of probes would be readied to perform detecting operations in the manner described hereinabove such as through a program schedule from the computer. Each discharge station could be provided with all of the circuitry to control sensing, counting and deflector operations, whereby the computer would operate to energize the system at a given chute location for the displacement of a given number of bundles at that location, then de-energize the system at that location and energize the system at another location. The wetting of the first and last bundles of a given group can be sufficient for the first and last bundles to remain wet throughout their travel along the conveyor so that the wet bundles can be detected when they reach a particular discharge chute location. It will be appreciated, therefore, that many modifications of the system and components described herein can readily be made without departing from the principals of the present invention.

Having thus described my invention, I claim:

1. A method of controlling the delivery of a predetermined number of articles from a conveyor to a discharge path leading from the conveyor at a location therealong comprising, providing deflection means at said location, moving said articles along the conveyor toward said location, wetting a surface of the first of said number of articles, detecting said wetted surface of said first article, actuating said deflecting means in response to detecting said wetted surface of said first article for said deflector means to deflect articles to said discharge path, wetting a surface of the last of said number of articles, detecting said wetted surface of said last article, and actuating said deflecting means in response to detecting said wetted surface of said last article to terminate the deflection of articles to said discharge path.

2. The method according to claim 1, and counting said number of articles and controlling said wetting of said last article in response to said counting.

3. A method of controlling the delivery of a predetermined number of stacks of newspapers from a conveyor to a discharge path leading from the conveyor at a location therealong comprising, providing deflecting means at said location, moving said stacks along the conveyor toward said location, wetting the upper surface of the newspaper on top of the first of said number of stacks electrically detecting said wetted surface to produce a first deflector control signal, actuating said deflecting means in response to said first signal to deflect said stacks of newspapers to said discharge path, wetting the upper surface of the newspaper on top the last of said number of stacks, electronically detecting said last named wetted surface to produce a second deflector control signal, actuating said deflecting means in response to said second signal to terminate the deflection of said stacks to said discharge path.

4. The method according to claim 3, and tying said stacks of newspapers prior to deflection of said stacks from said conveyor.

5. The method according to claim 3, and counting said number of stacks and controlling said wetting of said last stack in response to said counting.

6. A newspaper handling system comprising a stacking station, a bundle marking station, a detecting station and a discharge station, means at said stacking station to stack newspapers to provide a bundle, means to convey bundles from said stacking station along a path and sequentially to said marking, detecting and discharge stations, means at said marking station to apply a conductive substance to the first and last of a given number of said bundles, contact means at said detecting station for sensing said conductive substance, deflector means at said discharge station movable to a first position to deflect bundles laterally of said path and to a second position in which bundles moving along said path proceed past said discharge station, control circuit means, means connecting said contact means to said control circuit means, said control circuit means including means to produce an output signal when said contact means sense said conductive substance, means connecting said control circuit means with said deflector means and responsive to said output signal to move said deflector means respectively to said first and second positions when said contact means senses said first and last bundle.

7. The claim according to claim 6, wherein said contact means is a pair of probes of conductive material spaced apart relative to one antoher and each adapted to contact said conductive substance on said first and last bundles, said conductive substance connecting said probes in series and completing a circuit with said control circuit means.

8. The system according to claim 7, wherein said conductive substance is applied to the upper surface of said first and last bundles, means supporting said probes above said bundles for vertical reciprocating movement toward and away from said upper surface, means to move said probes downwardly to engage said upper surface, said probes each including normally open switch means closed upon engagement of the corresponding probe with said upper surface to complete said circuit with said control circuit means.

9. The system according to claim 8, and probe actuator means to extend and retract said probes toward and away from said upper surface, said probe actuator means including retracting means actuated through said control circuit means upon closing of said normally open switch means to move said probes away from said upper surface.

10. The system according to claim 9, and said probe actuator means including extending means operable through said control circuit means to move said probes toward said upper surface.

11. The system according to claim 10, wherein said control circuit means includes an actuator switch for controlling said extending means, said actuator switch being operated in response to a control signal to actuate said extending means, and said means at said stacking station including means to deliver a control signal to said actuator switch.

12. A newspaper handling system for delivering a predetermined number of bundles of newspapers to one of a plurality of discharge chutes along a conveyor path comprising, a stacking station, means at said stacking station to stack newspapers to provide successive bundles, means to convey said bundles along said conveyor path, a spraying station, controlled means at said spraying station to spray conductive liquid onto the upper surface of a bundle, spray and detector control signal means at said stacker station, a detector station, controlled sensing means at said detector station for contacting the upper surface and thus sensing the presence of a bundle at the detector station, a discharge station including a chute, controlled means at said discharge station to deflect bundles from said conveyor path to said chute and to permit bundles to continue along said path past said chute, control circuit means including counting means programmable to control delivery of said predetermined number of bundles from said stacking station to said chute, said counting means being operable to deliver a control signal to said spray control signal means at said stacking station for the first and last of said predetermined number of bundles conveyed along the conveyor path from said stacking station to be sprayed at said spraying station, said spray control signal means delivering a spray control signal to said controlled means at said spraying station whereby said first and last bundles are sprayed, said detector control signal means at said stacker station delivering a detector actuator signal to said controlled sensing means at said detector station for each bundle leaving said stacking station for said sensing means to sense each bundle, said control circuit means including means to deliver a count signal to said counting means each time a bundle is sensed at said detecting station, and said control circuit means further including means actuated by said sensing means contacting said conductive liquid on said first and last bundles to actuate said controlled means at said discharge station to respectively deflect said predetermined number of bundles from said path to said chute and terminate deflection of succeeding bundles to said chute.

13. The system according to claim 12, and a bundle tying station between said detecting and discharge stations.

14. A newspaper handling system comprising a stacking station for stacking newspapers to provide a number of successive bundles, a conveyor for moving said succession of bundles along a path, a wetting station along said path, means at said wetting station for wetting the upper surfaces of said first and last of said number of successive bundles with a conductive substance, a detecting station along said path means at said detecting station to sense each of said bundles in said succession and the wetted surface of said first and last bundles, a discharge station along said path, means at said discharge station actuatable to deflect said succession of bundles from said path, and control circuit means including means responsive to the sensing of said wetted surfaces of said first and last bundle to respectively actuate and deactuate said means at said discharge station.

15. The system according to claim 14, wherein said control circuit means includes counting means, said wetting means at said wetting station being actuated through said counting means.

16. The system according to claim 14, wherein said means to sense the wetted surfaces of said first and last bundles includes a pair of conductors spaced apart and connected to said control circuit means in series with one another by contacting said conductive substance.

17. The system according to claim 16, wherein each of said conductors is a probe adapted to engage said upper surfaces and including a normally open switch closed upon engagement of the probe with the upper surface.

* * * * *